United States Patent [19]

Glasman et al.

[11] Patent Number: 4,822,015
[45] Date of Patent: Apr. 18, 1989

[54] PINNING TABLE FOR FABRIC STACKS

[76] Inventors: Léon Glasman, 64, rue Charles Laffitte, 92200 Neuilly-Sur-Seine; Jean Omer M. Prioux, 16 Villa de L'Alliance, 95110 Sannois, both of France

[21] Appl. No.: 126,589
[22] Filed: Nov. 30, 1987

[30] Foreign Application Priority Data

Dec. 19, 1986 [FR] France ............... 86 17874

[51] Int. Cl.[4] ........................... B23Q 1/00
[52] U.S. Cl. ................. 269/54.1; 269/54.5
[58] Field of Search ............ 269/54.5, 54.1, 54.4, 269/287; 83/451, 925 C C; 294/87.1, 87.26

[56] References Cited

U.S. PATENT DOCUMENTS 1,869,717  2/1930  Silver ..................... 294/87.1

FOREIGN PATENT DOCUMENTS 2103657  3/1972  France .

Primary Examiner—Frederick R. Schmidt
Assistant Examiner—David A. Holmes
Attorney, Agent, or Firm—Marshall, O'Toole, Gerstein, Murray & Bicknell

[57] ABSTRACT

The invention provides a pinning table for fabric stacks of the type including:
an upper fixed platen provided with openings, and intended to receive the fabric;
a lower movable platen, parallel to the upper platen;
a plurality of pins adapted to be introduced into said holes in the upper platen, and connected to said lower platen; and
means for imparting a translational movement to the lower platen with respect to the fixed upper platen, in a direction perpendicular to said platens, wherein said lower platen is formed from at least a first and second superimposed plates each having a plurality of orifices arranged identically and corresponding to the openings in said upper platen, and in which the pins are introduced, at least one of said plates being slidable, in a limited way, with respect to the other plate through actuating means.

7 Claims, 2 Drawing Sheets

PINNING TABLE FOR FABRIC STACKS

BACKGROUND OF THE INVENTION

1. Field of the Invention

The present invention relates to pinning tables on which stacks of fabrics or similar are disposed for cutting into a particular shape.

Pinning tables are known of the type having an upper fixed platen provided with openings for example holes, and intended to receive the fabric stack, a lower platen movable parallel to the upper platen and a plurality of pins secured of said lower platen. Means for imparting a translational movement of the lower platen with respect to the upper platen in a direction perpendicular to the platens are also provided and thus make it possible, after raising of the lower platen towards the upper platen, to position the fabric layers for forming a stack. However, during cutting out properly speaking of the fabric stack, some pins, because of their position, may hinder the movement of the cutting tool. That risks causing the cutting out, in certain positions, not to follow the shape of the pattern.

2. Description of the Prior Art

A pinning table is also known, from the Pat. No. FR-A-2 103 657, of a similar design to that described above but in which the pins are removable since, after being introduced into the holes in the fixed platen, they simply rest by gravity, at one of their ends, on the lower movable platen, while being held in position by the walls of said holes. This table therefore makes it possible to arrange the removable needles in the vicinity of the contour defined by he pattern, without their hindering the progression of the cutting tool during cutting out of the fabric stack. However, during lowering of the lower platen, the pins very often remain caught in the mesh of the fabrics, consequently causing a not inconsiderable loss of time for removing them, and this at each operation for cutting out a fabric stack. In addition, even in the case where the next stack to be cut out is identical to the preceding one, it necessary to start again, pin by pin, to reconstitute the positioning of the pins.

SUMMARY OF THE INVENTION

The object of the present invention is to overcome these drawbacks and provides a pinning table ensuring temporary locking of the removable needles on said lower platen, particularly during the cutting out operation properly speaking as well as during lowering thereof.

For this, the pinning table for fabric stacks of the type including:
- an upper fixed platen provided with openings, and intended to receive said fabric stack;
- a lower movable platen, substantially parallel to said upper platen;
- a plurality of pins adapted to be introduced into said holes in the upper plate, and connected to said lower plate; and
- and means for imparting a translational movement to said lower platen with respect to said fixed upper platen, in a direction perpendicular to said platens, It is remarkable, in accordance with the invention, in that said lower platen is formed from at least a first and a second superimposed plates each having a plurality of orifices arranged identically and corresponding to the openings in said upper plate, and in which said pins can be introduced, and in that at least one of said platens is slidable, in a limited way, with respect to the other plate through actuating means communicating two endmost relative positions to said plates, a first position in which said pins are free in said orifices and a second position in which said pins are locked in said orifices by jamming between said plates.

Thus, with the invention, said pins may be temporarily locked on said lower platen, through the relative movement of the two plates forming it, causing jamming of the pins through the axial misalignment of the corresponding orifices formed in said plates.

In a preferred embodiment, said first plate, disposed opposite said upper platen, is able to slide over said second plate under the action of said actuation means. Sliding of the first plate may then be guided by two lateral flanges fixed on each side to said first plate.

Advantageously, sliding of said first plate is limited, in the two end positions, by stops disposed on said second plate.

In another characteristic of the invention, means may be provided for returning said second plate, into the first position, with respect to the second plate. These return means may be electric, mechanical, hydraulic, pneumatic, magnetic or similar.

So that said pins are suitably positioned in said orifices, these latter are preferably circular. Advantageously facilitating introduction of said pins into the lower platen, the input of the orifices of said first plate is conical.

BRIEF DESCRIPTION OF THE DRAWINGS

The figures of the accompanying drawings, better show how the invention may be put into practice. Identical references designate similar elements.

DESCRIPTION OF THE PREFERRED EMBODIMENT

Figure 1:
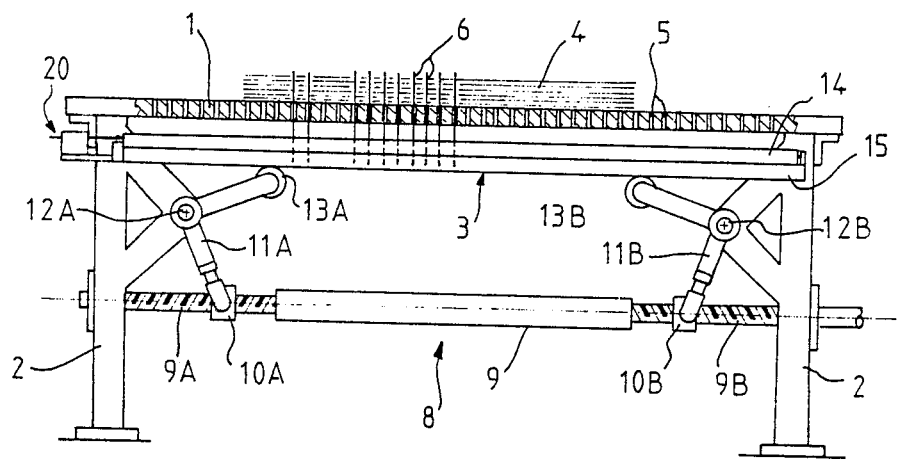
FIG. 1 is a schematical top view of a pinning table in accordance with the invention.

The pinning table shown in FIG. 1 includes a fixed upper platen 1 secured to a vertical upright 2, and a lower mobile platen 3 parallel to the upper platen. On this latter is disposed a stack of fabric 4 for cutting out to a given shape, by means of a cutting tool. A plurality of openings, such as holes 5 each having an identical circular section, are formed in the upper platen 1 to a precise grid pattern.

A plurality of pins 6, some of which have been shown in random fashion, are introduced into the holes 5 of the upper platen 1 and connected to the lower platen 3. The position of pins 6 as well as their number are determined as a function of the shape to be cut out and/or of the fabric patterns 4 resting on this platen.

The pinning table includes means 8 for imparting a translational movement to the lower platen 3 with respect to the fixed upper platen 1, in a direction perpendicular to the parallel planes defined by platens 1 and 3. These means 8 are similar to those described in Pat. No. FR-A-2 103 657 but could be of a different design, without departing from the scope of the invention. Schemtically, means 8 are formed by a rod 9, parallel to the platens and mounted at its ends in bearings, not shown, arranged in the uprights 2.

Rod 9 includes two portions 9a and 9b threaded in opposite directions and cooperating respectively with nuts 10a and 10b each fixed to the lower arm of a crank lever 11a and 11b mounted for rotation about a shaft 12a and 12b connected to an upright 2. Each upper arm of levers 11a and 11b carries a rotary roller 13a and 13b in contact, free or fixed, with the lower face of the lower platen 3. The rod may be moved by a handle, as was the case in the above mentioned patent, or else by an electric motor, not illustrated.

As can be seen in FIG. 1, pins 6 are connected to the lower platen 3. This latter is raised under the action of means 8 until the free ends of pins 6, after passing through holes 5, emerge above the upper platen 1.

In accordance with the invention, pins 6 are advantageously locked by jamming in the lower platen 3. For that, platen 3 is formed of two superimposed plates, a first plate 14 turned towards the upper platen 1, and a second plate 15, whose lower face is in contact with rollers 13a and 13b.

Figure 2:
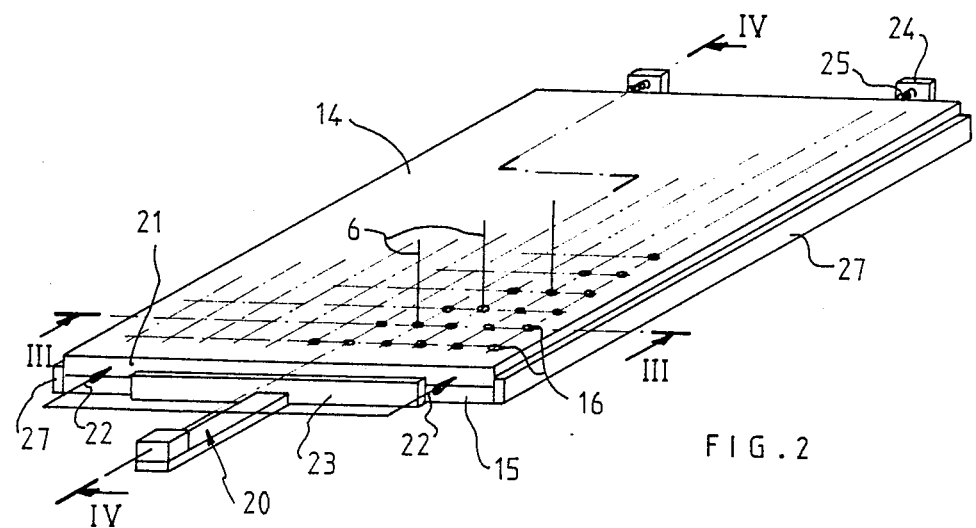
FIG. 2 shows a perspective view of the lower platen of the invention.
Figure 3:
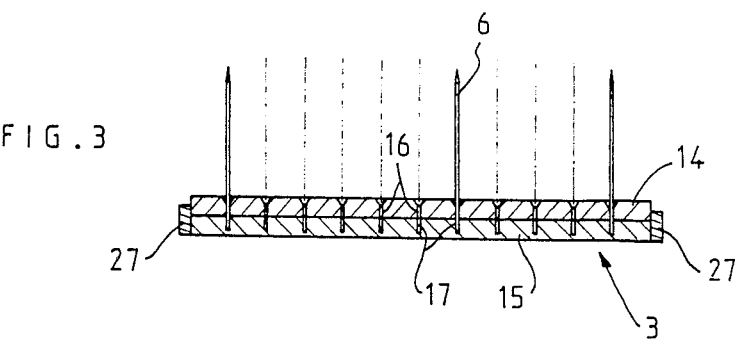
FIGS. 3 and 4 are sectional views of the lower platen illustrated in FIG. 2 respectively through line III—III and line IV—IV thereof.
Figure 4:
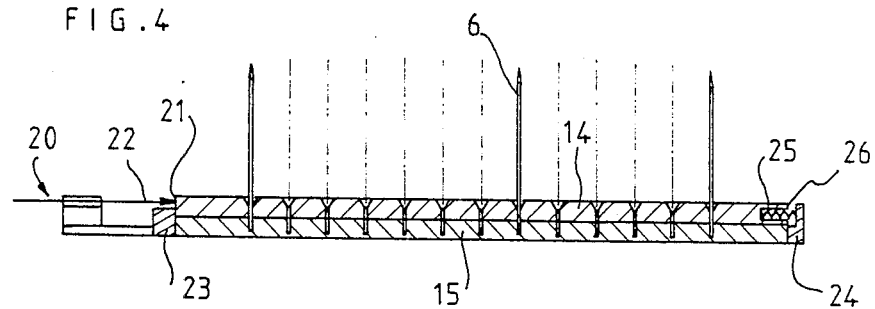

As can be better seen in FIGS. 2 to 4, each plate 14 and 15 is formed respectively with orifices 16 and 17 whose position and number are identical to the position and number of holes 5 formed in the upper platen 1. In this embodiment, orifices 16 and 17 have an identical circular section. However, orifices 17 of the second plate 15 are not through holes for obvious reasons, and the inlet of orifices 16 in the first plate 14 is tapered so as to facilitate insertion of pin 6 therein.

In order to provide locking of pins 6 introduced into orifices 16 and 17 by jamming, in this embodiment one of the plates must be able to slide, in a limited way, with respect to the other plate through actuating means, as will be explained with reference to FIGS. 5 and 6. In this embodiment, the first plate 14 may slide with respect to the second plate 15 through actuating means 20 shown schematically in the figures, but being at least one fluid or electric jack acting on the lateral face 21 of plate 14, as shown by arrow 22 in said figures.

The sliding travel of the first plate 14 is limited by stops 23 and 24, fixed, by screws not shown, to the first plate 15. Return means, for example springs 25, are provided between stops 24 and the lateral face 26, opposite face 21, of the first plate 14. In addition, sliding of this latter, with respect to the second plate 15, is guided by two lateral flanges 27 disposed on each side of plate 15.

Figure 5:
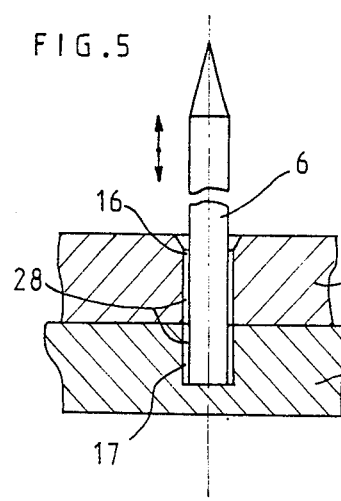
FIGS. 5 and 6 show partially, on a larger scale, the two end positions occupied by the two plates of said lower platen, namely a first position in which the pin shown is free in the orifices of said plates and a second position in which the pin is locked by jamming between said plates.
Figure 6:
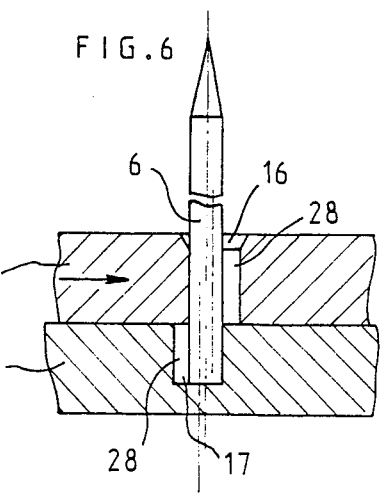

During positioning of pins 6, whose number and position have been previously determined as a function of the shape cut out and of the patterns of the fabrics, the orifices 16 and 17 in plates 14 and 15 are substantially coaxial (FIG. 5). The movable plate 14 is consequently in a first end position in which the pins 6 introduced into orifices 16 and 17 are axially free, a functional clearance 28 being provided between the diameter of pins 6 and orifices 16 and 17. Each pin is therefore substantially coaxial with the respective orifices 16 and 17.

FIG. 4 shows the first plate 14 in this first position. The lateral face 21 of plate 14 is pressed against the stop 23 connected to plate 15 under the action of springs 25. Pins 6 are held by limited sliding, corresponding in fact to the functional clearances 28 existing between each pin and the respective orifices 16 and 17, through the action of the jack forming, for example, the actuating means 20.

Thus, the first plate 14 of the lower platen 3 then occupies the second end position in which pins 6 are locked in orifices 16 and 17 by jamming between plates 14 and 15. As can be seen in FIG. 6, plate 14 is moved to the right, a wall portion of orifice 16 urging pin 6 against an opposite wall portion of orifice 17, so as to jam the pin between the two plates. In this configuration, the holes of orifices 16 and 17, and of pin 6, while remaining substantially parallel, are no longer coaxial. The functional clearance between pin 6 and orifice 16 is situated at the right in FIG. 6, whereas the functional clearance between needle 6 and orifice 17 is situated at the left.

Thus, in this second position, the lower platen 3 may be raised towards the upper platen by means 8 so that pins 6, locked by jamming, penetrate into the corresponding holes 5, whereafter the layers of fabric stacks may be pinned on the end of the pins emerging from platen 1. The fabric stack may then be cut out. The lower platen 3 is lowered by reversing the direction of rotation of means 8, the pins still being held between the plates of platen 3. Removal of the pins may then be obtained by releasing the actuating means 20, springs 25 bringing the first plate 14 back to the initial position (FIG. 5).

What is claimed is:

1. A pinning table for fabric stacks comprising:
   an upper fixed platen provided with holes, and intended to receive said fabric stack;
   a lower movable platen, substantially parallel to said upper platen;
   a plurality of removable pins supported by said lower platen and adapted to be introduced into said holes in the upper platen;
   means for imparting a translational movement to said lower platen with respect to said fixed upper platen, in a direction perpendicular to said platens; and
   locking means for locking said pins in said lower platen, said locking means comprising at least first and second superimposed plates forming said lower platen, each of said first and second plates having a plurality of orifices arranged identically and corresponding to the holes in said upper platen, and in which said pins can be introduced,
   at least one of said plates being slidable, with respect to the other plate, through actuating means between two end positions, a first position in which said pins are free in said orifices and a second position in which said pins are locked in said orifices by jamming between said plates.

2. The pinning table as claimed in claim 1 wherein said first plate, disposed opposite said upper platen, is sidable over said second plate under the action of said actuation means.

3. The pinning table as claimed in claim 1, wherein sliding of said first plate is guided by two lateral flanges fixed on each side to said second plate.

4. The pinning table as claimed in claim 1, wherein sliding of said first plate is limited, in the two end positions, by stops disposed on said second plate.

5. The pinning table as claimed in claim 1 wherein means are provided for returning said first plate, to the first position, with respect to the second plate.

6. The pinning table as claimed in claim 1, wherein said orifices, in the first and second plates, are circular.

7. The pinning table as claimed in in claim 1, wherein the input of the orifices of said first plate is tapered.

* * * * *